(12) United States Patent
Chen et al.

(10) Patent No.: US 12,359,975 B2
(45) Date of Patent: Jul. 15, 2025

(54) OBJECT RECOGNITION DEVICE AND OBJECT RECOGNITION METHOD

(71) Applicant: Hitachi, Ltd., Tokyo (JP)

(72) Inventors: Cong Chen, Tokyo (JP); Masayuki Kobayashi, Tokyo (JP); Yusuke Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 745 days.

(21) Appl. No.: 17/449,279

(22) Filed: Sep. 29, 2021

(65) Prior Publication Data

US 2022/0155149 A1 May 19, 2022

(30) Foreign Application Priority Data

Nov. 17, 2020 (JP) ................. 2020-190592

(51) Int. Cl.
*G01J 5/00* (2022.01)
*G06T 7/593* (2017.01)
*G06V 10/44* (2022.01)
*G06V 20/64* (2022.01)

(52) U.S. Cl.
CPC ............ *G01J 5/0025* (2013.01); *G06T 7/593* (2017.01); *G06V 10/443* (2022.01); *G06V 20/64* (2022.01); *G01J 2005/0077* (2013.01)

(58) Field of Classification Search
None
See application file for complete search history.

(56) References Cited

U.S. PATENT DOCUMENTS

2017/0277968 A1* 9/2017 Ikeda ................. G06V 10/40
2019/0349572 A1* 11/2019 Uemori ............... G06V 10/454

FOREIGN PATENT DOCUMENTS

JP 2007-133644 A 5/2007
JP 2012-53724 A 3/2012

\* cited by examiner

*Primary Examiner* — Erica S Lin
(74) *Attorney, Agent, or Firm* — Crowell & Moring LLP

(57) ABSTRACT

The problem to be solved by the invention is to accurately detect a distant object while preventing an increase in cost. An object recognition device includes: an imaging unit configured to acquire a plurality of thermal images having an object captured therein; a stereo matching unit configured to perform stereo matching using the plurality of thermal images and calculate a distance to the object; a specific temperature region extracting unit configured to extract a specific temperature region from the thermal images; and an area ratio estimating unit configured to estimate, based on the distance to the object calculated by the stereo matching unit, a ratio of an area of the object included in a pixel for the specific temperature region.

7 Claims, 9 Drawing Sheets

FIG. 3A
FIG. 3B
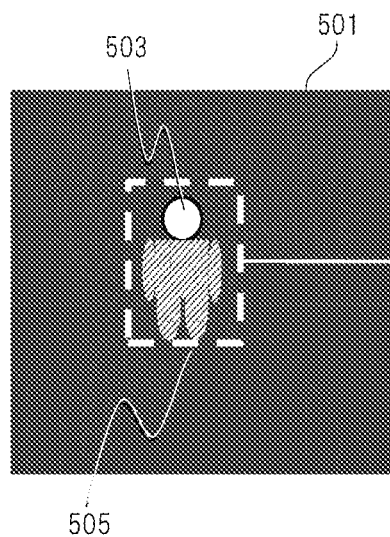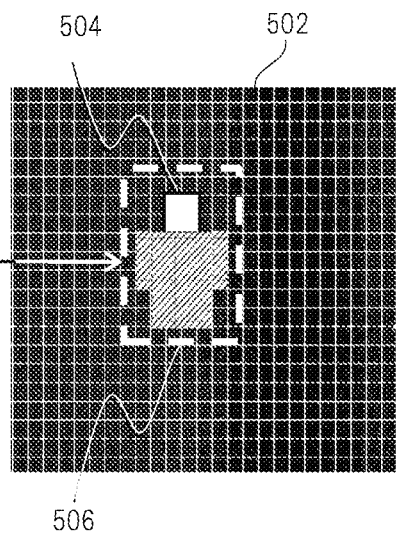
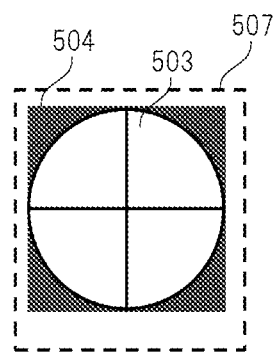
FIG. 3C

OBJECT RECOGNITION DEVICE AND OBJECT RECOGNITION METHOD

BACKGROUND OF THE INVENTION

1. Field of the Invention

2. Description of the Related Art

Objects emit far infrared rays when radiating heat. A far-infrared imaging sensor detects far infrared rays emitted by a detection target. The detected far infrared rays are converted into a thermal image showing a temperature distribution of the detection target by means of photoelectric conversion, signal processing, or the like.

Since humans are homeothermic animals, it is possible to detect a person even in a place with a bad light environment such as at night by using a far-infrared imaging sensor. Therefore, for example, JP-A-2012-53724 and JP-A-2007-133644 disclose techniques for detecting a person using a far-infrared imaging sensor.

For example, JP-A-2012-53724 discloses a pedestrian detection device that accurately extracts a pedestrian candidate by using a linear relationship used to calculate a temperature of a pedestrian based on a road surface temperature. Specifically, JP-A-2012-53724 discloses that "when a temperature difference between a temperature of a person candidate detected from a thermal image and a person temperature calculated by a person temperature calculating unit is larger than a preset value, it is determined that a person candidate adjacent to this person candidate is not a person".

In addition, JP-A-2007-133644 discloses a pedestrian recognition device that determines with high certainty the necessity of issuing an alarm when recognizing a pedestrian in the vicinity of a host vehicle and issuing an alarm to a driver. Specifically, JP-A-2007-133644 discloses that "when the temperature distribution detected by this temperature distribution detecting unit does not match the temperature distribution of a human, it is determined that there is no person".

However, in object recognition using the far-infrared imaging sensor, when a resolution of a distant object is insufficient, surrounding environment and other objects are reflected in one pixel, and therefore, a shape of the object cannot be identified, which makes it difficult to detect a distant object (for example, a person). In addition, it is considered to use several types of imaging sensors, but in this case, the cost is increased.

SUMMARY OF THE INVENTION

Therefore, an object of the invention is to provide an object recognition device capable of accurately detecting a distant object while preventing an increase in cost.

The typical ones of the inventions disclosed in this application will be briefly described as follows.

An object recognition device according to a typical embodiment of the invention includes: an imaging unit configured to acquire a plurality of thermal images having an object captured therein; a stereo matching unit configured to perform stereo matching using the plurality of thermal images and calculate a distance to the object; a specific temperature region extracting unit configured to extract a specific temperature region from the thermal images; and an area ratio estimating unit configured to estimate, based on the distance to the object calculated by the stereo matching unit, a ratio of an area of the object included in a pixel for the specific temperature region.

The effect obtained by the typical ones of the inventions disclosed in this application will be briefly described as follows.

That is, according to the typical embodiment of the invention, it is possible to accurately detect a distant object while preventing an increase in cost.

BRIEF DESCRIPTION OF THE DRAWINGS

FIGS. 3A-3C show diagrams illustrating an example of a real image of thermal radiation of a distant detection target and an image of the detection target in the image.

DESCRIPTION OF THE PREFERRED EMBODIMENTS

First Embodiment

Figure 1:
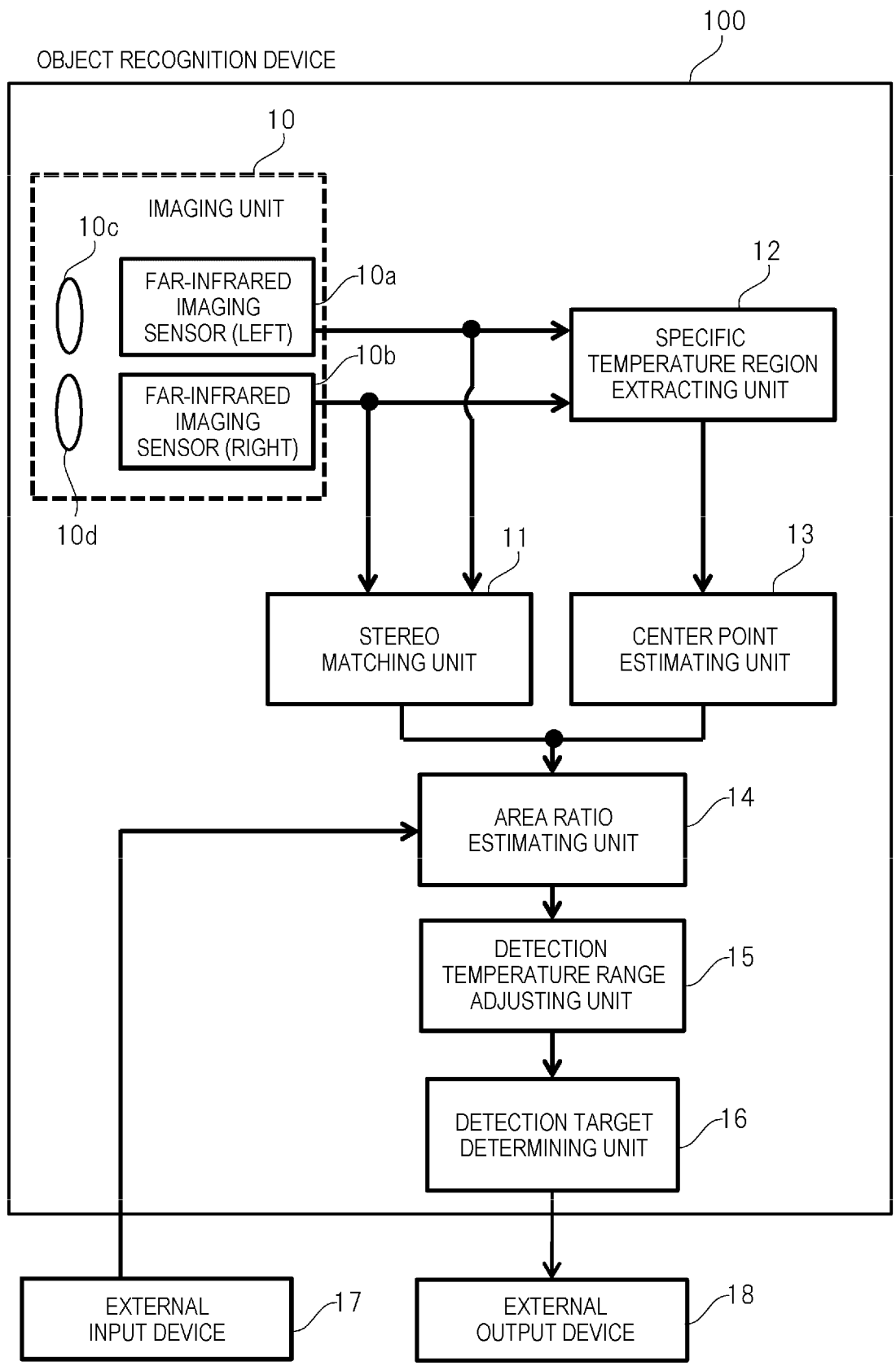
FIG. 1 is a block diagram showing a configuration of a first embodiment of the invention.

Hereinafter, embodiments of the invention will be described with reference to the drawings. The embodiments to be described below are only examples for implementing the invention, and do not limit the scope of the invention. In the embodiments, members having same functions are denoted by same reference numerals, and repetitive description thereof will be omitted unless particularly necessary.

Outline

In the present embodiment, when a resolution of a distant object is insufficient, a distance to the distant object is calculated by stereo matching of a plurality of thermal images, and a detection temperature range of the object is adjusted according to the calculated distance. Since the detection temperature range is adjusted according to the distance, it is possible to accurately detect the distant object while preventing an increase in cost.

Configuration of Object Recognition Device

FIG. 1 is a configuration diagram showing an example of a configuration of an object recognition device according to a first embodiment of the invention. As shown in FIG. 1, an object recognition device 100 includes an imaging unit 10, a stereo matching unit 11, a specific temperature region extracting unit 12, a center point estimating unit 13, an area ratio estimating unit 14, a detection temperature range adjusting unit 15, and a detection target determining unit 16.

The imaging unit 10 is a functional block that detects far infrared rays emitted from a detection target and generates a thermal image. As shown in FIG. 1, the imaging unit 10 includes a first far-infrared imaging sensor 10*a*, a second far-infrared imaging sensor 10*b*, a first lens 10*c* corresponding to the first far-infrared imaging sensor 10*a*, and a second lens 10*d* corresponding to the second far-infrared imaging sensor 10*b*. The first lens 10*c* and the second lens 10*d* are made of a material capable of transmitting far infrared rays.

The first far-infrared imaging sensor 10*a* and the second far-infrared imaging sensor 10*b* detect the far infrared rays emitted when the detection target radiates heat, and perform processing such as photoelectric conversion and signal processing on the detected far infrared rays. Accordingly, the first far-infrared imaging sensor 10*a* and the second far-infrared imaging sensor 10*b* each generate a thermal image showing a temperature distribution of the detection target based on the detected far infrared rays. The thermal image generated by the first far-infrared imaging sensor 10*a* is defined as a first thermal image, and the thermal image generated by the second far-infrared imaging sensor 10*b* is defined as a second thermal image. These thermal images show temperatures detected in each pixel.

These thermal images are generated based on the far infrared rays detected at the same timing. Hereinafter, the first thermal image and the second thermal image may be referred to as a thermal image or a pair of thermal images. The thermal image shows a level of a temperature of a subject detected in each pixel, and a brightness value of each pixel has a correlation with the temperature.

As the first far-infrared imaging sensor 10*a* and the second far-infrared imaging sensor 10*b*, for example, quantum sensors or uncooled sensors are preferably used. However, the invention is not limited to these sensors, and various far-infrared sensors may be used.

The imaging unit 10 is connected to the stereo matching unit 11 and the specific temperature region extracting unit 12. The imaging unit 10 outputs the generated pair of thermal images (the first thermal image and the second thermal image) to the stereo matching unit 11 and the specific temperature region extracting unit 12.

The stereo matching unit 11 is connected to the imaging unit 10 and the area ratio estimating unit 14. The stereo matching unit 11 performs stereo matching on the pair of thermal images composed of the first thermal image and the second thermal image, and calculates a distance to an object. Then, the stereo matching unit 11 outputs the calculated distance to the object to the area ratio estimating unit 14. The stereo matching unit 11 may be provided in the imaging unit 10.

The specific temperature region extracting unit 12 is connected to an external input device (for example, a register and a GUI) 17, the imaging unit 10, and the area ratio estimating unit 14. The specific temperature region extracting unit 12 extracts from the thermal image a specific temperature region composed of pixels in which a temperature within a preset specific temperature range has been detected. The specific temperature range is a temperature range for detecting the detection target, and is set based on, for example, specific temperature range setting information input from the external input device 17. The specific temperature range is a temperature range assumed as a temperature of the detection target, and different specific temperature ranges may be set for detection targets.

Then, the specific temperature region extracting unit 12 acquires a temperature of the extracted specific temperature region and coordinates of the specific temperature region, and outputs the acquired temperature of the specific temperature region and the coordinates of the specific temperature region to the center point estimating unit 13.

The center point estimating unit 13 is connected to the specific temperature region extracting unit 12 and the area ratio estimating unit 14. The center point estimating unit 13 estimates a center point position of the object in the specific temperature region based on the temperature of the specific temperature region and the coordinates of the specific temperature region output from the specific temperature region extracting unit 12. The center point estimating unit 13 outputs the estimated center point position of the object to the area ratio estimating unit 14.

The area ratio estimating unit 14 is connected to the external input device 17, the stereo matching unit 11, the center point estimating unit 13, and the detection temperature range adjusting unit 15. The area ratio estimating unit 14 estimates a ratio between an area of the object and an area of an environmental region in the thermal image based on the distance to the object output from the stereo matching unit 11 and the center point position of the object output from the center point estimating unit 13. For example, the area ratio estimating unit 14 estimates (calculates) the ratio between the area of the object and the area of the environmental region for all pixels having an object captured therein.

Then, the area ratio estimating unit 14 outputs the estimated ratio between the area of the object and the area of the environmental region to the detection temperature range adjusting unit 15. In this case, for example, the area of the object subjected to estimation and the area of the environmental region themselves may be output, or the ratio of the area of the object to the area of the environmental region and one of the areas may be output in a set as a pair of information.

It is assumed that when the detection target is, for example, a person, the area of the face of the person who is the object may be smaller than an actual area due to wearing a cap or mask. Therefore, the area of the object subjected to estimation and the area of the environmental region are adjusted as necessary by an operation from the external input device 17.

The detection temperature range adjusting unit 15 is connected to the external input device 17, the area ratio estimating unit 14, and the detection target determining unit 16. The detection temperature range adjusting unit 15 is a functional block that adjusts the preset detection temperature range of the detection target. For example, when there is no pixel occupied only by the object in the thermal image, that is, when the surrounding environment is also captured in all the pixels having the object captured therein, a temperature of the object cannot be accurately detected based on the thermal image.

In such a case, the detection temperature range adjusting unit 15 adjusts the detection temperature range of the detection target and calculates an adjusted detection temperature range of the detection target based on the preset detection temperature range of the detection target and the ratio between the area of the object and the area of the environmental region in the thermal image output from the area ratio estimating unit 14. Then, the detection temperature range adjusting unit 15 outputs the calculated adjusted detection temperature range to the detection target determining unit 16. The detection temperature range of the detection target can also be adjusted by input from the external input device 17.

Meanwhile, when there is no pixel occupied only by the object in the thermal image, the detection temperature range adjusting unit 15 does not have to adjust the preset detection temperature range.

The detection target determining unit 16 is connected to the detection temperature range adjusting unit 15 and an external output device 18. The detection target determining unit 16 determines whether an object which is the detection target is included in the thermal image by using the adjusted detection temperature range output from the detection temperature range adjusting unit 15. The detection target determining unit 16 outputs a determination result for the object captured in the thermal image to the external output device 18. In this case, the detection target determining unit 16 may output the determination result only when it is determined that the object captured in the thermal image is the detection target.

Examples of the external output device 18 include a display and an in-vehicle electronic control unit (ECU). In the ECU, for example, a brake or the like is controlled based on the determination result output from the detection target determining unit 16.

Object Recognition Method

Figure 2:
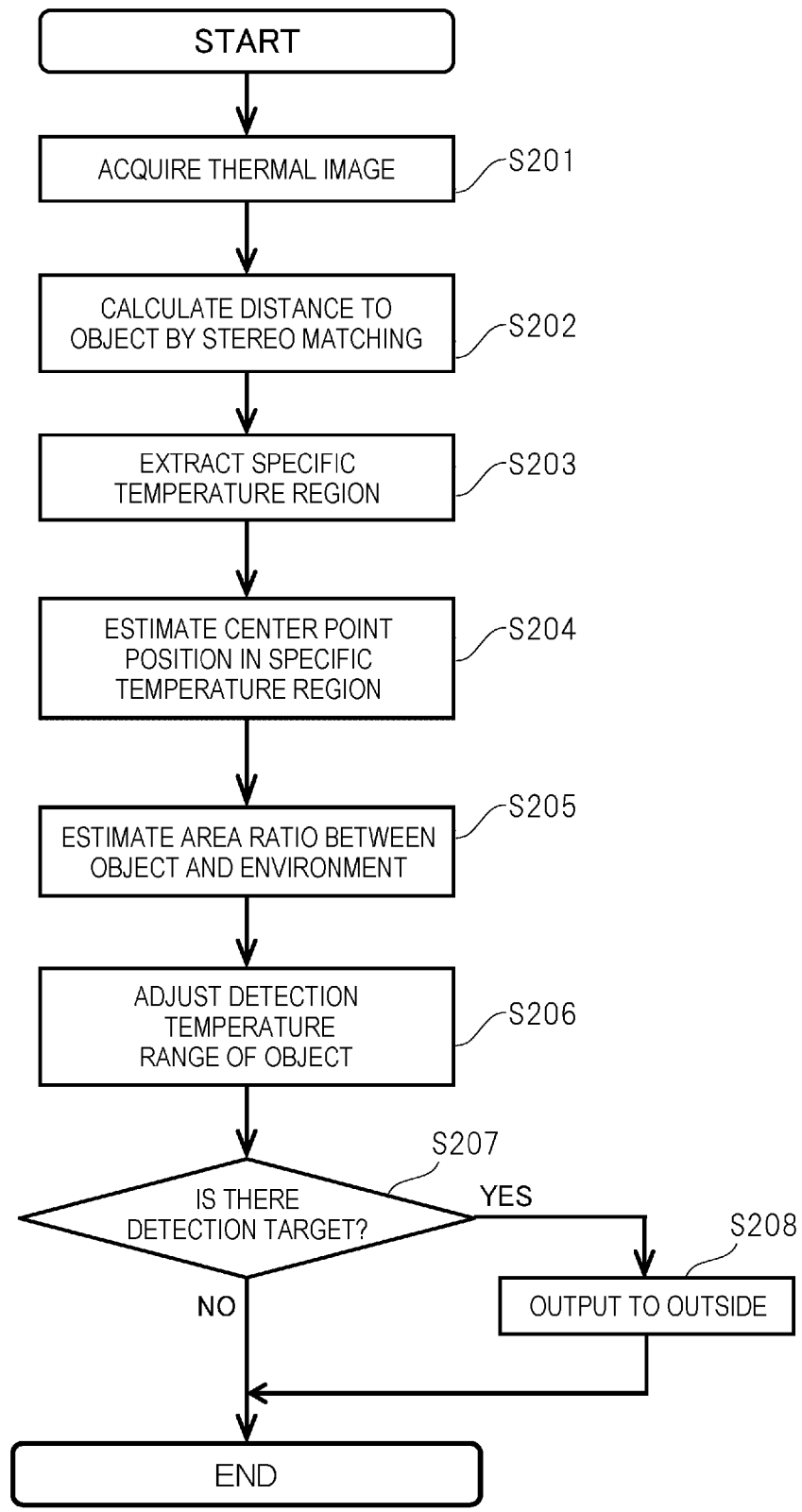
FIG. 2 is a flowchart showing a form of a processing procedure in the first embodiment of the invention.

Next, an object recognition method will be described. Hereinafter, a case where the detection target is a person will be described as an example. FIG. 2 is a flowchart showing an example of an object recognition method according to the first embodiment of the invention. In object recognition using a thermal image, for example, steps S201 to S208 shown in FIG. 2 are executed.

In the step S201, the imaging unit 10 acquires a thermal image. FIG. 3 shows diagrams illustrating an example of a real image of thermal radiation of a distant object and an image of the object in a thermal image corresponding to the real image. 501 in (a) of FIG. 3 is a real image of thermal radiation of a person who is an object and surroundings thereof when the person is in the distance. The real image 501 shows an observation result of thermal radiation of the real image 501 as seen from the imaging unit 10 in an environment where a temperature is constant (for example, an environmental temperature TB=20° C.) when the person is in the distance. In (a) of FIG. 3, 505 is the person in the distance, and 503 is a face part of the person. 502 in (b) of FIG. 3 is a thermal image obtained by capturing the real image 501 by the imaging unit 10. In (b) of FIG. 3, 506 is the person in the thermal image 502, and 504 is a face part of the person in the thermal image 502.

507 in (c) of FIG. 3 is a diagram showing the face part 503 of the person 505 in the real image 501 superimposed on the face part 504 in the thermal image 502. As shown in (c) of FIG. 3, the face part 503 of the real image 501 is included in four pixels of the face part 504 of the thermal image 502. In addition, in each of these pixels, the face part 503 is captured in a state of being mixed with a background of the person 505.

Thus, in a state where the face part and the background are mixed in one pixel and there is no pixel occupied only by the face part, in the thermal image 502, an average temperature of the face part and the background is observed, and an actual temperature of the face part 503 cannot be detected. In the following description, a case where there is no pixel occupied only by a face part of a person who is a detection target is referred to as an insufficient resolution state.

Figure 4A:
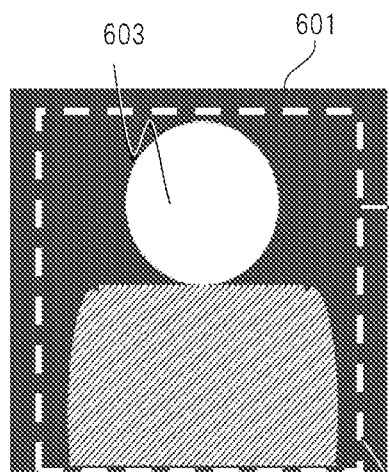
FIGS. 4A-4C show diagrams illustrating an example of a real image of thermal radiation of a close detection target and an image of the detection target in the image.
Figure 4B:
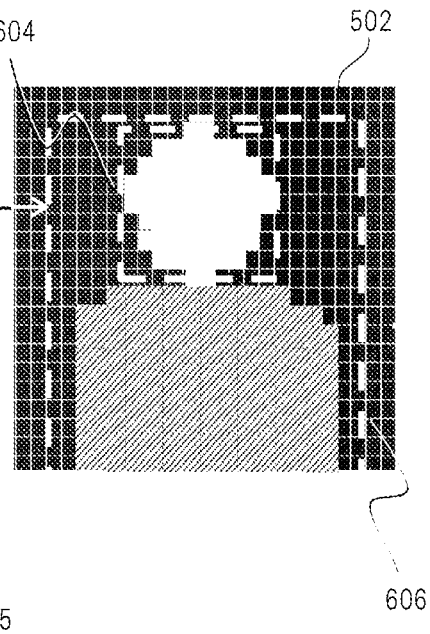
Figure 4C:
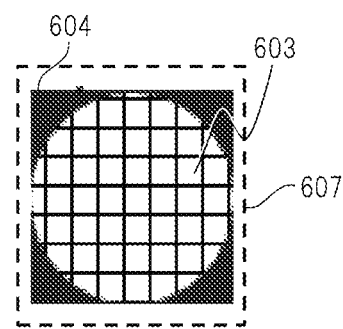

Next, FIG. 4 shows diagrams illustrating an example of a real image of thermal radiation of a close object and an image in a thermal image corresponding to the real image. 601 in (a) of FIG. 4 is a real image of thermal radiation of a person who is an object and surroundings thereof when the person is nearby. The real image 601 shows an observation result of thermal radiation of the real image 601 as seen from the imaging unit 10 in an environment where a temperature is constant (for example, an environmental temperature TB=20° C. as in FIG. 3) when the person is nearby. In (a) of FIG. 4, 605 is the person nearby, and 603 is a face part of the person nearby. 602 in (b) of FIG. 4 is a thermal image obtained by capturing the real image 601 by the imaging unit 10. In (b) of FIG. 4, 606 is the person in the thermal image 602, and 604 is a face part of the person in the thermal image 602.

607 in (c) of FIG. 4 is a diagram showing the face part 603 of the person 605 in the real image 601 superimposed on the face part 604 in the thermal image 602. As shown in (c) of FIG. 4, the face part 604 of the thermal image includes a pixel occupied only by the face part. In this case, unlike the example in FIG. 3, an actual temperature of the face part 603 of the real image 601 can be detected in the thermal image 602. In the following description, a case where a pixel occupied only by a detection target is included is referred to as a sufficient resolution state.

The imaging unit 10 in the present embodiment includes two far-infrared imaging sensors and lenses corresponding to the far-infrared imaging sensors, and thus can acquire two thermal images captured at the same timing. The imaging unit 10 separately outputs the acquired pair of thermal images to the stereo matching unit 11 and the specific temperature region extracting unit 12.

In the step S202, the stereo matching unit 11 calculates a distance to the object. The stereo matching unit 11 performs stereo matching processing on the pair of thermal images output from the imaging unit 10. The stereo matching unit 11 calculates the distance to the object based on parallax information between the two thermal images, that is, the first thermal image and the second thermal image. Specifically, the distance calculated here is a distance from the object to the imaging unit 10 (for example, a far-infrared imaging sensor). When the thermal image includes a plurality of objects, the stereo matching unit 11 separately calculates distances to all the objects. Alternatively, a distance only to an object included in a specific region in the thermal image may be calculated. The parallax information is preset information and is appropriately changed according to a configuration of the imaging unit 10.

Examples of a stereo matching method include methods such as block matching (BM), semi-global BM (SGBM), and graph cut (GC). When BM is used, algorithms such as a sum of absolute differences (SAD) and a sum of squared differences (SSD) may be used. In addition, the stereo matching method is not limited to these methods, and various methods other than these methods can be applied.

In the step S203, the specific temperature region extracting unit 12 extracts, from one or a plurality of thermal images output from the imaging unit 10, a specific temperature region composed of the pixels in which a temperature within the preset specific temperature range has been detected.

For example, when extracting a specific temperature region, the specific temperature region extracting unit 12 sets search regions each composed of a total of 4 pixels including 2 pixels each in vertical and horizontal directions, searches for pixels in which a temperature within the specific temperature range has been detected for each of the search regions, and extracts, as the specific temperature region, a search region including the pixels in which a temperature within the specific temperature range has been detected.

When the pixels in which a temperature within the specific temperature range has been detected are present in a plurality of adjacent search regions, if the environmental temperature is lower than the specific temperature range, the specific temperature region extracting unit 12 selects a search region having the highest average detection temperature of the 4 pixels constituting the search region, and extracts the selected search region as the specific temperature region.

On the other hand, when the pixels in which the temperature within the specific temperature range has been detected are present in a plurality of adjacent search regions, if the environmental temperature is higher than the specific temperature range, the specific temperature region extracting unit 12 selects a search region having the lowest average detection temperature of the 4 pixels constituting the search region, and extracts the selected search region as the specific temperature region.

Here, a method of setting the specific temperature range will be described by exemplifying a case where the detection target is a person. In this case, the specific temperature region extracting unit 12 detects, for example, a temperature of the exposed face part of the person. There are individual differences in the temperature of the face part. In addition, the temperature of the face part varies due to various factors such as the exercise, wearing of a mask, and the environmental temperature. The specific temperature range is set in consideration of such variations in the temperature of the face part. In addition, the specific temperature range can be adjusted by input from the external input device 17. Statistical processing of a temperature of each pixel in each of the thermal images is performed, and a temperature with the highest frequency is set as the environmental temperature.

Figure 5:
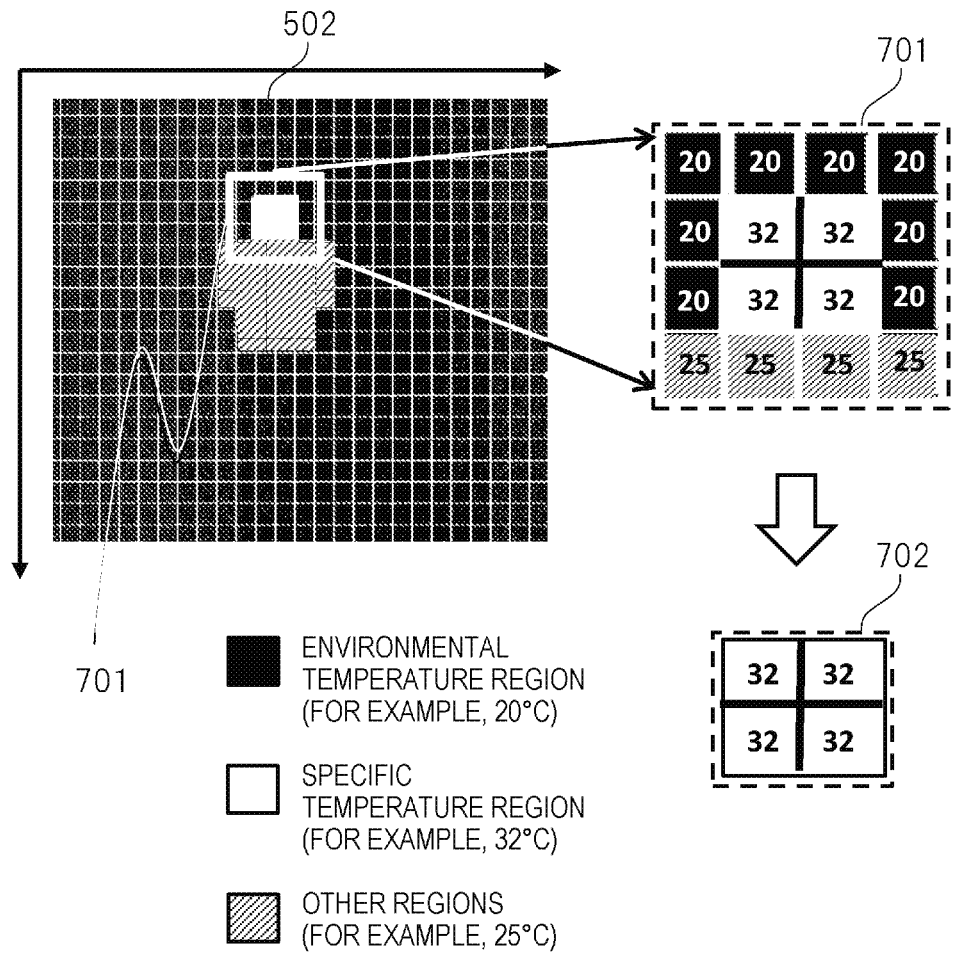
FIG. 5 is a diagram illustrating processing of searching for a specific temperature region by a specific temperature region extracting unit in the invention.

FIG. 5 is a diagram illustrating processing of extracting the specific temperature region. FIG. 5 shows an image 701 by enlarging the specific temperature region in the thermal image 502 and a region including several pixels around the specific temperature region.

A brightness value of each of the pixels in the thermal image does not indicate the temperature. However, for the sake of simplicity, the temperature of each of the pixels is shown in the figure assuming that the brightness value of each of the pixels indicates the temperature.

As shown in FIG. 5, the image 701 includes a black environmental temperature region (for example, environmental temperature TB=20° C.), a white specific temperature region 702 in the figure (for example, specific temperature TD=32° C.), and other regions, that is, a shaded part (for example, temperature=25° C.). In the image 701, since the temperature with the highest frequency is 20° C., a region where the environmental temperature TB=20° C. has been detected is recognized as the environmental temperature region.

In addition, a region with a temperature of 32° C. is extracted as the specific temperature region 702 assuming that a region where the specific temperature TD=32° C. has been detected is within the specific temperature range.

In FIG. 5, a case where the specific temperature region is extracted using the image 701 as an example has been described, but in fact, the specific temperature region is extracted across the entire area of the thermal image 502. The specific temperature region extracting unit 12 generates specific temperature region information including temperature information of the extracted specific temperature region and coordinate information of the extracted specific temperature region, and outputs the generated specific temperature region information to the center point estimating unit 13. The specific temperature region information includes, for example, coordinates and detected temperature values of all the pixels constituting the specific temperature region.

In the step S204, the center point estimating unit 13 estimates a center point position of the object in the specific temperature region based on the specific temperature region information output from the specific temperature region extracting unit 12.

Figure 6:
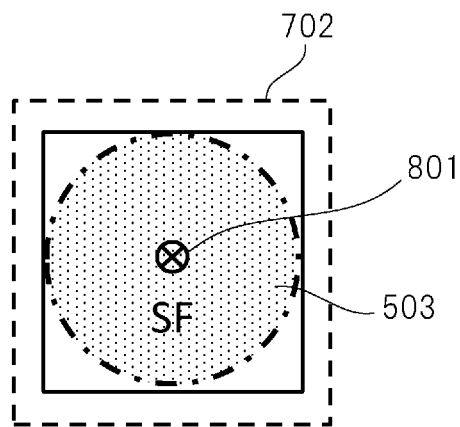
FIG. 6 is a diagram illustrating processing of estimating a center point position of a real image of a face of a person by a center point estimating unit in the invention.

FIG. 6 is a diagram illustrating the face part in the real image and a center thereof in the specific temperature region. FIG. 6 shows a situation where a center point position 801 of the face part 503 of the real image is in the specific temperature region 702. The center point estimating unit 13 estimates, for example, the center point position 801 of the face part 503 of the real image by using the temperature value and the coordinates of each of the pixels in the specific temperature region 702 included in the specific temperature region information. Since an area of the face part 503 of the real image has not been calculated at this stage, a boundary of the face part 503 of the real image is shown by a broken line. A method of calculating the area of the face part 503 of the real image will be described later.

Figure 7:
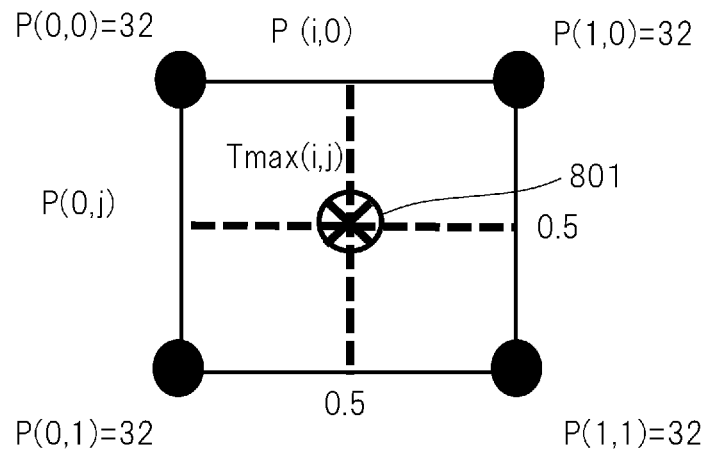
FIG. 7 is a diagram illustrating a first calculation example of center point position estimation in the invention.

FIG. 7 is a diagram illustrating an example of a method of estimating a center point position of an object. FIG. 7 shows a method of estimating the center point position using FIG. 5 as an example. The center point estimating unit 13 firstly sets a maximum temperature value of the specific temperature region 702 in advance. For example, if the detection target is a person, a maximum temperature value Tmax is set to an average temperature of human faces of 35° C.

A position (i, j) shown in FIG. 7 separately indicates an abscissa and an ordinate of a position where the maximum temperature value has been detected. Comparing FIG. 7 and FIG. 6, the position (i, j) having the maximum temperature value is the center point position 801 of the face part 503 of the real image.

Next, as shown in FIG. 7, in the specific temperature region 702, for example, 4 pixels having the same temperature value (for example, 32° C.) are selected so as to surround the position (i, j) having the maximum temperature value. Positions of these pixels are (0, 0), (1, 1), (0, 1), and (1, 0) for convenience of explanation. That is, each of temperatures P (0, 0), P (1, 1), P (0, 1), and P (1, 0) at the positions (0, 0), (1, 1), (0, 1), and (1, 0) is 32° C.

A position (i, 0) is a position of a temperature maximum value P (i, 0) in the horizontal direction, and a position (0, j) is a position of a temperature maximum value P (0, j) in the vertical direction. The maximum temperature value P (i, 0) in the horizontal direction and the maximum temperature value P (0, j) in the vertical direction are equal to the maximum temperature value Tmax=35° C.

The position having the maximum temperature value is calculated using, for example, the following Equations 1 and 2.

$$i = \frac{P(i, 0) - P(0, 0)}{P(i, 0) - P(0, 0) + P(i, 0) - P(1, 0)} \qquad \text{(Equation 1)}$$

$$i = \frac{P(0, j) - P(0, 0)}{P(0, j) - P(0, 0) + P(0, j) - P(0, 1)} \qquad \text{(Equation 2)}$$

The Equation 1 is an equation that calculates the abscissa of the position having the maximum temperature value based on a ratio of differences between temperatures at each of the positions and the maximum temperature value. The Equation 2 is an equation that calculates the ordinate of the position having the maximum temperature value based on a ratio of differences between temperatures at each of the positions and the maximum temperature value.

The position having the maximum temperature value is calculated as (0.5, 0.5) based on the temperature value of each of the positions and the Equations 1 and 2 described above. That is, as shown in FIG. 7, when the 4 pixels having the same temperature value are used, the position (i, j) having the maximum temperature value is a center of the 4 pixels. In other words, using the method of FIG. 7, the center point position 801 of the face part 503 of the real image is the center of the coordinates of the 4 pixels.

Next, another method of calculating the center point position will be described. In the example of FIG. 7, pixels having the same temperature value within a specific temperature region have been selected. Here, a method of calculating the center point position when pixels having different temperature values have been selected will be described.

Figure 8:
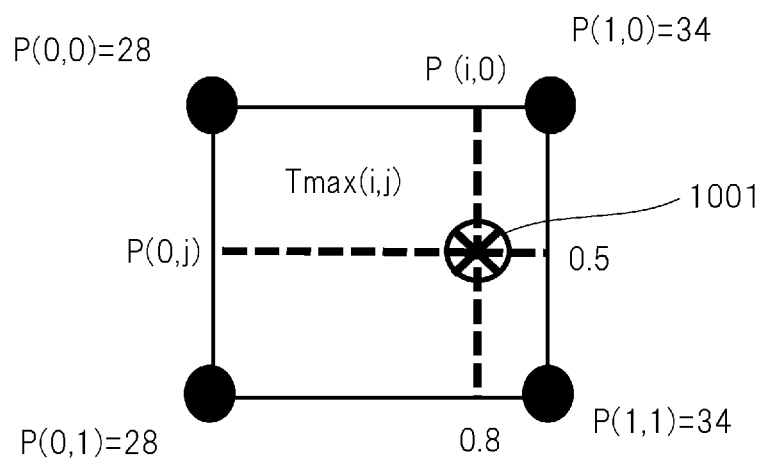
FIG. 8 is a diagram illustrating a second calculation example of center point position estimation in the invention.

FIG. 8 is a diagram illustrating another example of the method of estimating the center point position of the object. In FIG. 8, 4 pixels at positions (0, 0), (1, 0), (0, 1), and (1, 1) surrounding the position having the maximum temperature value are selected. In addition, temperature values detected from the selected 4 pixels are P (0, 0)=28° C., P (1, 0)=34° C., P (0, 1)=28° C., and P (1, 1)=34° C. The position (i, j) having the maximum temperature value is calculated as (0.5, 0.8) by substituting these values into the Equations 1 and 2. Therefore, in this case, coordinates of a center point position 1001 of the face part 503 of the real image are (0.5, 0.8).

The center point estimating unit 13 outputs information about the calculated (estimated) center point position of the object (for example, the center point position of the face part 503 of the real image) to the area ratio estimating unit 14.

It should be noted that two types of methods of estimating the center point position of the object by selecting 4 pixels surrounding the position having a maximum temperature value have been described here, but the method of estimating the center point position of the object is not limited to these. For example, it is possible to estimate the center point position of the object by using methods such as an interpolation method and a quadratic polynomial fitting method.

In the step S205, the area ratio estimating unit 14 estimates a ratio between the area of the object (for example, the face part 503 of the real image) and an environment area based on the distance to the object calculated by the stereo matching unit 21 and the center point position of the object estimated by the center point estimating unit 23.

Figure 9:
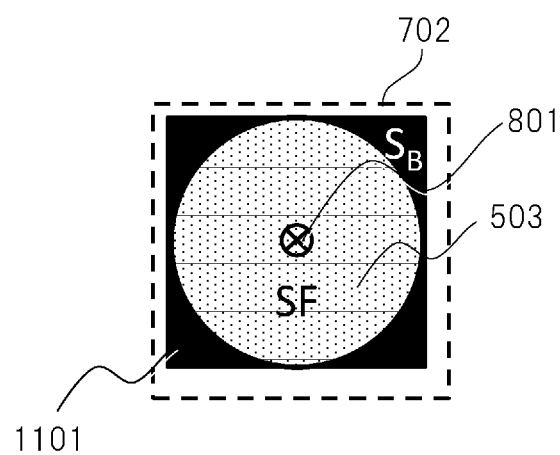
FIG. 9 is a diagram illustrating processing of estimating a center point position of a real image of a face of a person by the center point estimating unit in the invention.

FIG. 9 is a diagram illustrating a method of calculating the ratio between the area of the object and the environment area. The area ratio estimating unit 14 acquires area information of the detection target (for example, an area of a human face). The area information of the detection target is a preset value. The area information of the detection target may be a value stored in the object recognition device or a value input from the external input device 17.

The area ratio estimating unit 14 calculates an area SF (unit: number of pixels) of the face part 503 of the real image which is an object, based on the distance to the object calculated in the step S202. When the area of the face of the person is narrowed due to wearing of a cap or a mask, the area information of the detection target described above can be adjusted to the actual area. The area information of the detection target is adjusted by, for example, the external input device 17.

For example, when an area of a face of a person at a distance of 100 m is 350 cm$^2$, the area of the face part 503 of the real image in the thermal image is SF (pixels). That is, in this case, the face part 503 of the real image is captured in the SF pixels. When the area SF of the face part 503 is calculated, the area ratio estimating unit 14 calculates an area of an environmental temperature region 1101 in the specific temperature region 702. If the area of the specific temperature region 702 is S (pixels) and the area of the environmental temperature region 1101 is SB (pixels), S=SF+SB. The area ratio estimating unit 14 calculates the area SB of the environmental temperature region 1101 using this relational expression.

Then, the area ratio estimating unit 14 calculates (estimates) the ratio between the area SF of the face part 503 and the area SB of the environmental temperature region 1101, and outputs the calculated ratio between the area SF of the face part 503 and the area SB of the environmental temperature region 1101 to the detection temperature range adjusting unit 15.

The area ratio estimating unit 14 may output the area SF of the face part 503 and the area SB of the environmental temperature region 1101 to the detection temperature range adjusting unit 15 together with the ratio between the area SF of the face part 503 and the area SB of the environmental temperature region 1101. In addition, the area ratio estimating unit 14 may output only the area SF of the face part 503 and the area SB of the environmental temperature region 1101 to the detection temperature range adjusting unit 15 instead of the ratio between the area SF of the face part 503 and the area SB of the environmental temperature region 1101.

In the step S206, the detection temperature range adjusting unit 15 adjusts the detection temperature range of the detection target (for example, a person). The detection temperature range adjusting unit 15 acquires temperature information of the detection target (for example, a temperature of a human face). The temperature information of the detection target is a preset value. The temperature information of the detection target may be a value stored in the object recognition device or a value input from the external input device 17.

The detection temperature range adjusting unit 15 calculates a temperature threshold value TS of the specific temperature region, when there is a person, by using the detected environmental temperature (for example, TB=20° C.) and the area (SF) of the face of the person (the area of the object) in the thermal image calculated in the step S205. The temperature threshold value TS is calculated using, for example, Equation 3 shown below. In the Equation 3, TF is a temperature of an object (for example, a face temperature of a person).

$$TS = TB\frac{SB}{SB+SF} + TF\frac{SF}{SB+SF} \qquad \text{(Equation 3)}$$

Figure 10:
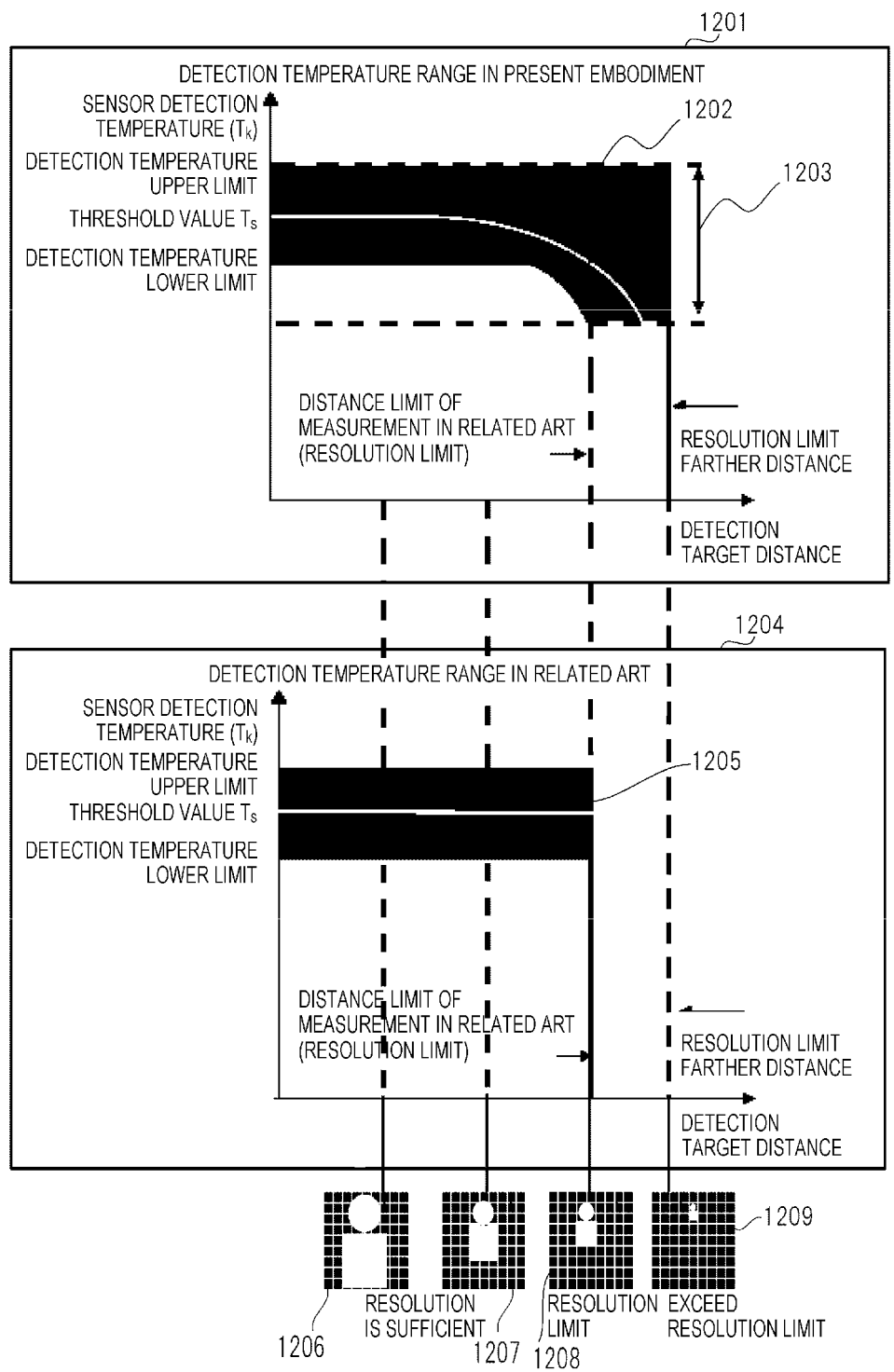
FIG. 10 is a diagram illustrating an example of a detection temperature range used in a detection temperature range adjusting unit in the first embodiment of the invention in comparison with the related art.

FIG. 10 is a diagram illustrating a method of setting a detection temperature range. FIG. 10 shows the detection temperature range in the present embodiment and a detection temperature range in the related art by comparison. FIG. 10 shows a case where the detection target is a person.

A relationship diagram 1201 shows a relationship between a detection target distance and a detection temperature range of a person in the present embodiment.

A relationship diagram 1201 shows a relationship between a detection target distance and a detection temperature range of a person in the related art.

Each of horizontal axes of the relationship diagrams 1201 and 1204 represents the detection target distance indicating a distance from the object to the imaging unit 10, and each of vertical axes of the relationship diagrams 1201 and 1204 indicates the temperature of the object detected by the far-infrared imaging sensor.

1206, 1207, 1208, and 1209 are thermal images of the person who is the detection target. In these thermal images, a white part shows the real image of the person. The thermal image 1206 is an image captured in closest among these thermal images. Therefore, the face part of the person in the thermal image 1206 is captured in the largest size. The thermal image 1207 is an image captured at a distance farther than that of the thermal image 1206. The thermal image 1208 is an image captured at a distance farther than that of the thermal image 1207, and is an image captured when the person is at a limit distance where the resolution of the face part of the person is sufficient. The thermal image 1209 is an image captured when the person is at a distance where the resolution of the person is insufficient.

Conditions such as body temperatures and areas of faces of persons vary. When the detection temperature range of the person is not set in consideration of such variations, even though a person is actually captured in the thermal image, only persons who match a predetermined condition can be detected. Specifically, in the step S205, when the area of the face of the person at a distance of 100 m has been set to 350 cm$^2$, but when the detection temperature range is not set, for example, a person having an area of a face of 400 cm$^2$ cannot be detected.

Therefore, the detection temperature range adjusting unit 15 separately sets a temperature range of the face of the person and an area range of the face of the person, calculates a detection temperature upper limit and a detection temperature lower limit, and sets the detection temperature range of the person.

For example, the area range of the face of the person is set to 300 cm$^2$ to 400 cm$^2$, and the temperature range of the face of the person is set to 34° C. to 36° C. The area range and the temperature range may be values stored in the object recognition device or values input from the external input device 17.

The detection temperature range adjusting unit 15 sets, to the detection temperature upper limit, the detection temperature of the person under conditions of the smallest area (300 cm$^2$) of the face and the highest temperature (surface temperature, 36° C.) of the face. Meanwhile, the detection temperature range adjusting unit 15 sets, to the detection temperature lower limit, the detection temperature of the person under conditions of the largest area (400 cm$^2$) of the face and the lowest temperature (34° C.) of the face.

As shown in the relationship diagram 1201, the detection temperature range of the person is a range from the detection temperature lower limit to the detection temperature upper limit. Thus, setting the detection temperature range of the person makes it possible to detect, as the detection target, a person whose temperature and face area vary within a certain range.

However, as already mentioned, in the insufficient resolution state where the face part and the background are mixed in one pixel and there is no pixel occupied only by the face part, the average temperature of the face part and the background is observed, and the detected temperature deviates from the detection temperature range. Therefore, in the detection temperature range in the related art, the detection target cannot be detected in the insufficient resolution state.

Therefore, in the present embodiment, the detection temperature range is adjusted in a state where the detection target distance is long and the resolution is insufficient. When the detection target is a person, if the environmental temperature is lower than the face temperature of the person, the detection temperature of the pixel having the face part 503 of the real image captured therein is lower than the face temperature. Therefore, the detection temperature range adjusting unit 15 sets the detection temperature lower limit in the insufficient resolution state to be lower than that in a state where the detection target distance is short and the resolution is sufficient. An adjustment amount of the detection temperature lower limit here may be a preset value or may be calculated by, for example, an operation such as multiplying of the detection temperature lower limit before adjustment in the state where the detection target distance is short and the resolution is sufficient by a predetermined ratio.

An example of a method of adjusting the detection temperature range will be specifically described. In the thermal image 1206 and the thermal image 1207, there are pixels occupied only by the face part of the person. The detection temperature range is not adjusted at distances at which these thermal images can be obtained.

In contrast, since there is no pixel occupied only by the face part at a distance at which the thermal image 1208 can be obtained, the face temperature lower than the actual temperature is detected. Therefore, as shown in FIG. 10, when the distance to the object becomes long and exceeds the distance where the resolution is insufficient, the detection temperature lower limit is set low.

As shown in FIG. 10, the detection temperature lower limit may be gradually lowered from a distance shorter than a distance which is a resolution limit corresponding to the thermal image 1208, that is, the detection temperature range may be gradually widened.

In contrast, if the environmental temperature is higher than the detection temperature of the object, the detection temperature range adjusting unit 15 adjusts the detection temperature range by increasing the detection temperature upper limit. Therefore, as shown in FIG. 10, the detection temperature range in the insufficient resolution state is set wider than that in the sufficient resolution state.

In the step S207, the detection target determining unit 207 determines whether the object in the specific temperature region is the detection target. For example, in the example of FIG. 5, the specific temperature of the specific temperature region 702 is TD=32° C., and the detection target determining unit 16 determines whether the specific temperature TD is within a detection temperature range 1202 of a person.

When the specific temperature TD is within the detection temperature range 1202 of the person (YES), the detection target determining unit 16 determines that the object in the specific temperature region is the detection target (for example, a person). In this case, the processing proceeds to the step S208, and the detection target determining unit 16 outputs information such as the thermal image and the specific temperature region information to the external output device 18, and ends the object detection processing.

On the other hand, in the step S207, when the specific temperature TD is not within the detection temperature range 1202 of the person (NO), the detection target determining unit 16 determines that the object in the specific temperature region is not the detection target (for example, a person). In this case, the object detection processing based on the thermal image is ended without outputting information such as the thermal image and the specific temperature region information.

Main Effects of Present Embodiment

According to the present embodiment, it is determined whether the object within the specific temperature range is the detection target by adjusting the detection temperature range of the object within the specific temperature range according to the distance to the object calculated using stereo matching of the thermal image.

According to this configuration, it is not necessary to use a plurality of types of sensors, and therefore, it is possible to accurately detect a distant object while preventing an increase in cost.

In addition, according to the present embodiment, the area ratio estimating unit 14 estimates the ratio between the area of the object and the environment area based on the distance to the object and the center point position in the specific temperature region. In addition, the detection temperature range adjusting unit 16 calculates the temperature threshold value of the object for the specific temperature region based on the distance to the object and the area ratio, and adjusts the detection temperature range. According to this configuration, it is possible to appropriately set the detection temperature range.

In addition, according to the present embodiment, the detection temperature range adjusting unit 15 changes the detection temperature range according to the environmental temperature. According to this configuration, it is possible to set an appropriate detection temperature range according to the environment.

In addition, according to the present embodiment, the detection temperature range can be changed by the external input device 17. According to this configuration, it is possible to set an appropriate detection temperature according to the state of the object or the detection target.

In addition, according to the present embodiment, a set value of the area of the object can be changed by the external input device 17. According to this configuration, it is possible to set an appropriate detection temperature according to the state of the object or the detection target.

Others

Here, a case of detecting a person is described as an example, but the detection target is not limited to a person. Various homeothermic animals, homeothermic objects, etc. can also be set as the detection target by adjusting information such as the specific temperature range, the actual area of the detection target, and the temperature of the detection target. For example, when detecting a homeothermic animal having a temperature lower than that of a person, the detection can be made by lowering the detection temperature range according to the Equation 3. In addition, for example, when detecting a homeothermic animal or a homeothermic object having a temperature higher than that of a person, the detection can be made by increasing the detection temperature range according to the Equation 3.

In addition, when detecting a homeothermic animal or a homeothermic object larger than a person, the detection can be made by setting the area (SF) of the face part 503 of the real image to a large value in the Equation 3. When detecting a homeothermic animal smaller than a person, the homeothermic animal can also be detected by setting the area (SF) of the face part 503 of the real image to a small value in the Equation 3.

Comparison with Related Art

As described above, as shown in FIG. 10, in the related art, the detection temperature range is not adjusted according to the distance to the object. Therefore, when the resolution limit of the object is exceeded, a temperature detected by a pixel is influenced by environment, etc., and an accurate temperature of the object cannot be detected, making it difficult to reliably detect the detection target.

For example, the environmental temperature is lower than the temperature of the object. When the object is near the imaging unit 10 and the resolution is sufficient, there is a pixel occupied only by the object, and therefore, the actual temperature of the object can be detected. On the other hand, when the resolution is insufficient, the environment and other objects are reflected in one pixel, so the detection temperature is averaged and a temperature lower than the temperature of the object is detected. In the related art, the detection temperature range is not adjusted according to the distance, and therefore, when the resolution exceeds the limit, the detection target cannot be accurately detected.

Second Embodiment

Next, a second embodiment will be described. Hereinafter, the description of parts that overlap with the above-described embodiment will be appropriately omitted.

In the present embodiment, a detection temperature range is adjusted according to the distance, and determination is performed for an object within the detection temperature range. However, when setting a detection temperature range, it is necessary to detect a temperature of an object in advance. In contrast, in the present embodiment, the temperature of the object is estimated based on the distance to the object calculated by stereo matching of the far-infrared imaging sensor. According to the present embodiment, the actual temperature of the object is estimated, and thus the present embodiment can be applied to detection of a temperature of an object whose resolution is insufficient. The present embodiment is also not limited to the detection of a person.

Figure 11:
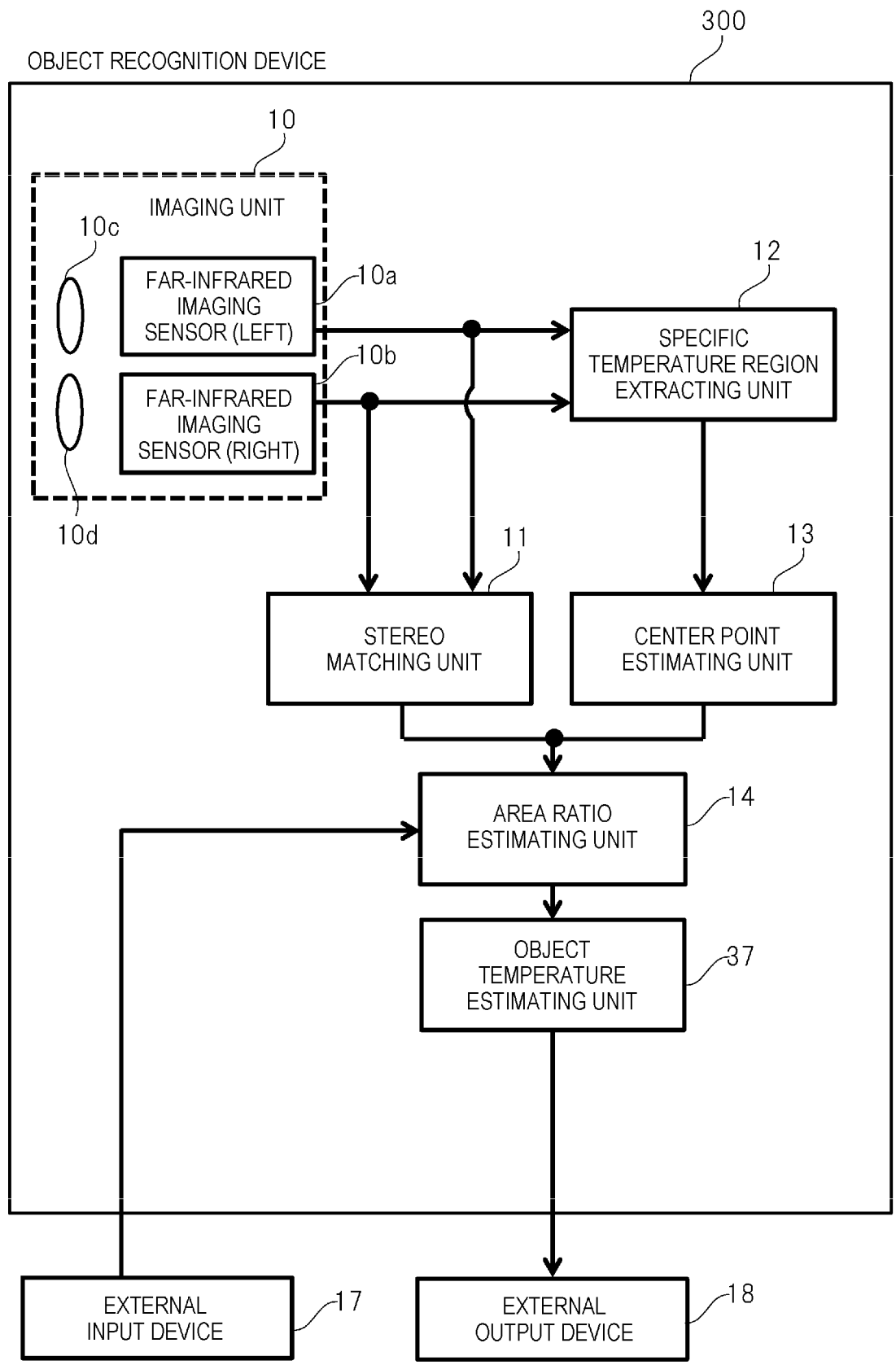
FIG. 11 is a block diagram showing a configuration of a second embodiment of the invention.

FIG. 11 is a configuration diagram showing an example of a configuration of an object recognition device according to the second embodiment of the invention. An object recognition device 300 in FIG. 11 is similar to the object recognition device 100 in FIG. 1, and has a configuration in which the detection temperature range adjusting unit 15 and the detection target determining unit 16 are replaced with an object temperature estimating unit 37.

As shown in FIG. 11, the object temperature estimating unit 37 is connected to the area ratio estimating unit 14 and the external output device 18. The object temperature estimating unit 37 calculates (estimates) the temperature of the object based on the ratio between the area of the object and the area of the environmental region in the specific temperature region output from the area ratio estimating unit 14. Then, the object temperature estimating unit 37 outputs the calculated temperature (estimated temperature) of the object to the external output device 18.

Figure 12:
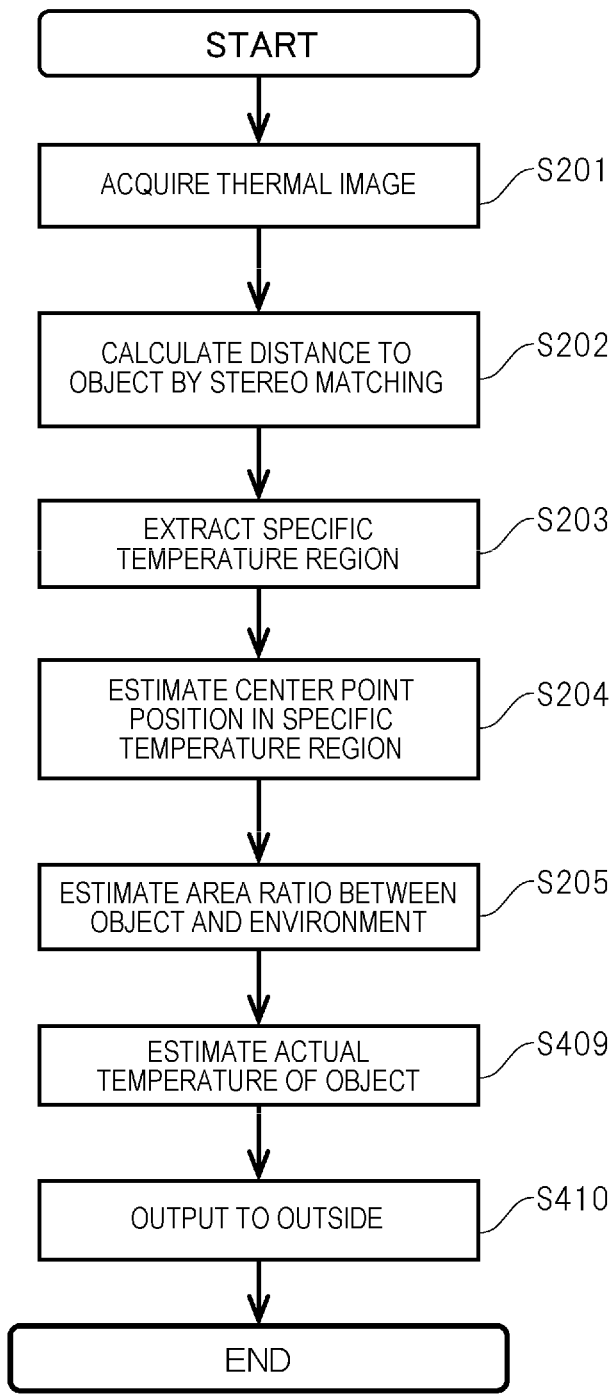
FIG. 12 is a flowchart showing a form of a processing procedure in the second embodiment of the invention.

FIG. 12 is a flowchart showing an example of an object recognition method according to the second embodiment of the invention. FIG. 12 is similar to FIG. 2, and the steps S206 to S208 in FIG. 2 are replaced with steps S409 to S410.

The processing of the steps S201 to S204 in FIG. 12 is the same as that in the first embodiment. The step S205 is substantially the same as that in the first embodiment. In the first embodiment, the face of the person has been described as an example, while in the present embodiment, an object having a general known size is described as an example. For example, there is a known object having an area of 350 cm² in the distance.

The area ratio estimating unit 14 estimates a ratio between an area of the object (for example, corresponding to the area SF of the face part) and an environment area in a thermal image having the object captured therein based on the distance to the object calculated in the step S202 and the known area 350 cm² of the object. The area ratio estimating unit 14 outputs the estimated area ratio to the object temperature estimating unit 37.

In the step S409, the object temperature estimating unit 37 estimates an actual temperature TF of the object. Hereinafter, the actual temperature of the object is also referred to as the actual temperature. The actual temperature TF is estimated using, for example, Equation 4 below.

$$TK = TB \frac{SB}{SB+SF} + TF \frac{SF}{SB+SF} \quad \text{(Equation 4)}$$

The object temperature estimating unit 37 estimates the actual temperature TF of the object by using a detection temperature TK (for example, TK=32° C.) in the specific temperature region, the detected environmental temperature TB (for example, TB=20° C.), and the estimated ratio between the area SF of the object and the area SB of the environmental temperature region.

In the step S410, the object temperature estimating unit 37 outputs the estimated actual temperature TF of the object to the external output device 18. When the step S410 is ended, the object recognition processing is ended.

According to the present embodiment, an actual temperature of a distant object whose resolution is insufficient is estimated. Thus, the present embodiment can also be applied to temperature detection of an object whose resolution is insufficient.

It should be noted that the invention is not limited to the above-described embodiments, and includes various modifications. For example, the above-described embodiments have been described in detail to facilitate understanding of the invention and are not limited to an embodiment including all the constituent elements described above. In addition, it is possible to replace a part of the configuration of an embodiment with a configuration of another embodiment, and it is also possible to add a configuration of an embodiment to a configuration of another embodiment.

Further, another configuration may be added to a part of the configuration of each embodiment, and a part of the configuration of each embodiment may be eliminated or replaced with another configuration. Furthermore, the above-described configurations, functions, processing units, processing means, etc. may be totally or partially implemented in hardware, for example, by designing them as an integrated circuit. Moreover, the above-described configurations, the functions, etc. may also be implemented by software by a processor interpreting and executing programs that implement the functions. Information about the programs, tables, files, etc. which implement the functions may be placed either in a storage device such as a memory, hard disk, or solid-state drive (SSD) or in a storage medium such as an IC card, SD card, or DVD.

What is claimed is:

1. An object recognition device comprising:
   an imaging unit configured to acquire a plurality of thermal images having an object captured therein;
   a stereo matching unit configured to perform stereo matching using the plurality of thermal images and calculate a distance to the object;
   a specific temperature region extracting unit configured to extract a specific temperature region from the thermal images;
   an area ratio estimating unit configured to estimate, based on the distance to the object calculated by the stereo matching unit, a ratio of an area of the object to an environment area of surroundings around the object included in a pixel for the specific temperature region;
   a detection temperature range adjusting unit configured to adjust a detection temperature range of the object based on the distance to the object and the ratio; and
   a detection target determining unit configured to determine, based on an adjusted detection temperature range, whether the object present in the specific temperature region is a detection target.

2. The object recognition device according to claim 1 further comprising:
   a center point estimating unit configured to estimate a center point position in the specific temperature region, wherein
   the area ratio estimating unit estimates a ratio between the area of the object and the environment area based on the distance to the object calculated by the stereo matching unit and the center point position estimated by the center point estimating unit,
   the detection temperature range adjusting unit calculates a temperature threshold value of the object for the specific temperature region based on the distance calculated by the stereo matching unit and the ratio, and adjusts the detection temperature range, and
   the detection target determining unit determines whether the object present in the specific temperature region is a detection target by determining whether a temperature of the specific temperature region is within the adjusted detection temperature range.

3. The object recognition device according to claim 2, wherein the detection temperature range adjusting unit changes the detection temperature range according to an environmental temperature.

4. The object recognition device according to claim 2, wherein
   the detection temperature range is changeable by an external input device provided outside the object recognition device.

5. The object recognition device according to claim 2, wherein
   setting of the area of the object is changeable by an external input device provided outside the object recognition device.

6. The object recognition device according to claim 1, further comprising:
   an object temperature estimating unit configured to estimate a temperature of the object for the specific temperature region based on the distance calculated by the stereo matching unit.

7. The object recognition device according to claim 6, further comprising:
   a center point estimating unit configured to estimate a center point position in the specific temperature region, wherein
   the area ratio estimating unit estimates a ratio between the area of the object and the environment area based on the distance to the object calculated by the stereo matching unit and the center point position estimated by the center point estimating unit, and
   the object temperature estimating unit calculates an actual temperature of a detection target of the object for the specific temperature region based on the distance to the object calculated by the stereo matching unit and the ratio.

\* \* \* \* \*